United States Patent
Seo et al.

(10) Patent No.: US 11,670,280 B2
(45) Date of Patent: Jun. 6, 2023

(54) URBAN AIR MOBILITY NOISE REDUCTION SYSTEM AND METHOD

(71) Applicant: HYUNDAI MOBIS CO., LTD., Seoul (KR)

(72) Inventors: Yeong Woo Seo, Busan (KR); Ju Seong Yu, Gyeonggi-do (KR); Jin Woo Choi, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/550,840

(22) Filed: Dec. 14, 2021

(65) Prior Publication Data

US 2022/0375451 A1 Nov. 24, 2022

(30) Foreign Application Priority Data

May 21, 2021 (KR) .................... 10-2021-0065335

(51) Int. Cl.
*G10K 11/178* (2006.01)
*G06N 3/04* (2023.01)

(52) U.S. Cl.
CPC .... *G10K 11/17883* (2018.01); *B64C 2220/00* (2013.01); *G06N 3/04* (2013.01); *G10K 2210/1281* (2013.01); *G10K 2210/3011* (2013.01); *G10K 2210/3044* (2013.01); *G10K 2210/3047* (2013.01); *G10K 2210/3056* (2013.01)

(58) Field of Classification Search
CPC ..... G10K 11/17883; G10K 2210/1281; G10K 2210/3011; G10K 2210/3044; G10K 2210/3047; G10K 2210/3056; B64C 2220/00; G06N 3/04
USPC ....................................................... 381/71.11
See application file for complete search history.

(56) References Cited

U.S. PATENT DOCUMENTS

| | | |
|---|---|---|
| 9,442,496 B1 | 9/2016 | Beckman et al. |
| 10,176,792 B1 | 1/2019 | Elzinga et al. |
| 2016/0379619 A1 | 12/2016 | Sugaya |
| 2017/0154618 A1* | 6/2017 | Beckman .......... G10K 11/17857 |
| 2019/0108827 A1 | 4/2019 | Konishi et al. |
| 2020/0001469 A1 | 1/2020 | Park |

FOREIGN PATENT DOCUMENTS

| | | |
|---|---|---|
| JP | 19930304165 A | 6/1995 |
| JP | 6618283 B2 | 12/2019 |
| JP | 6723716 B2 | 7/2020 |

\* cited by examiner

*Primary Examiner* — Vivian C Chin
*Assistant Examiner* — Douglas J Suthers
(74) *Attorney, Agent, or Firm* — NSIP Law

(57) ABSTRACT

An urban air mobility (UAM) noise reduction system and method are provided, where the UAM noise reduction system includes a UAM configured to detect and to provide rotation per minute (RPM) information of a propeller and location coordinate information, and a noise canceling device configured to predict a noise canceling sound wave amplitude on the basis of the RPM information of the propeller and the location coordinate information received through the UAM and to output a noise canceling sound wave corresponding to the predicted noise canceling sound wave amplitude to the UAM.

10 Claims, 3 Drawing Sheets

- SPEED INFORMATION
  (RECEIVED THROUGH COMMUNICATION)
- LOCATION INFORMATION
  (RECEIVED THROUGH COMMUNICATION)
- NOISE INFORMATION
  (RECEIVED THROUGH MICROPHONE)
- Etc.

URBAN AIR MOBILITY NOISE REDUCTION SYSTEM AND METHOD

CROSS-REFERENCE TO RELATED APPLICATIONS

This application claims the benefit under 35 USC § 119(a) of Korean Patent Application No. 10-2021-0065105, filed on May 20, 2021 in the Korean Intellectual Property Office, the entire disclosure of which is incorporated herein by reference for all purposes.

BACKGROUND

1. Field of the Invention

The present disclosure relates to a noise reduction method.

2. Discussion of Related Art

Urban air mobilities (hereinafter referred to as "UAMs") exceeding temporal and spatial constraints are emerging as the leader in upcoming future urban mobilities.

In recent years, successive announcements of strategies related to development of UAMs, such as EHang, Uber, and Toyota, all over the world have proved that three-dimensional (3D) air transportation means is a key to next-generation mobility.

In Korea, the Ministry of Land, Infrastructure and Transport reported that "Urban sky roads will be opened in 2025", and the Hyundai Motor Group presented UAM models at CES2020 held in January 2020 on the subject of future mobility solution.

A burning problem among many problems of the UAM is noise.

Generally, aircrafts are transportation means that make a lot of noise, and even large drones make tremendous noise.

UAMs, i.e., aircrafts moving through cities, cannot be commercialized when the UAMs make noise as loud as a noise that existing aircrafts make.

The low-noise standard presented by Uber is 62 dB@500 ft, and many companies are trying to solve this problem.

Various attempts have been made to reduce noise of existing UAMs, for example, by selecting a vertical takeoff and landing system using electrical power instead of an engine or applying distributed rotors rather than a single rotor.

However, noise cannot be reduced perfectly only by analyzing and removing a cause of noise of an aircraft and thus a supplementary method of reducing noise in a different way may be a new solution.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an urban air mobility (UAM) noise reduction system including a UAM configured to detect and to provide rotation per minute (RPM) information of a propeller and location coordinate information, and a noise canceling device configured to predict a noise canceling sound wave amplitude on the basis of the RPM information of the propeller and the location coordinate information received through the UAM and to output a noise canceling sound wave corresponding to the predicted noise canceling sound wave amplitude to the UAM.

The noise canceling device may include a communicator configured to receive the RPM information of the propeller and the location coordinate information through communication with the UAM, a deep learning machine configured to predict the noise canceling sound wave amplitude on the basis of the RPM information of the propeller and the location coordinate information of the UAM that are received through the communicator, one or more speakers configured to output the noise canceling sound wave, and an output controller configured to control the one or more speakers to output the noise canceling sound wave amplitude predicted by the deep learning machine.

The UAM noise reduction system may include a weather information inputter configured to receive weather information, wherein the deep learning machine may predict the noise canceling sound wave amplitude based on the RPM information of the propeller, the location coordinate information of the UAM, and the weather information.

The UAM noise reduction system may include a microphone configured to receive noise generated, in response to the UAM taking off or landing, and a noise canceling sound wave calculator configured to calculate an offset wave using the noise received through the microphone.

The UAM noise reduction system may include a verifier configured to verify a noise canceling sound wave amplitude predicted from the offset wave and to manage the verified noise canceling sound wave amplitude by storing the verified noise canceling sound wave amplitude in a database.

In another general aspect, there is provided a processor-implemented urban air mobility (UAM) noise reduction method including receiving rotation per minute (RPM) information of a propeller and location information from a UAM, determining whether accumulated data is sufficient by analyzing an alternating effect between the RPM information and the location information that are factors received from the UAM, predicting a noise canceling sound wave amplitude by applying the received factors to a deep learning machine, in response to determining that the accumulated data is sufficient, storing information about the factors used in predicting the noise canceling sound wave amplitude in a database, in response to determining that the accumulated data satisfies a reference reliability, and outputting the predicted noise canceling sound wave amplitude through a speaker.

The UAM noise reduction method may include calculating a noise canceling sound wave amplitude using noise information collected through a microphone, in response to determining that the accumulated data is insufficient.

The UAM noise reduction method may include determining whether weather information is input, and analyzing the alternating effect between the factors using the RPM information of the propeller and the location information received from the UAM and the weather information, in response to determining that the weather information is input.

The UAM noise reduction method may include receiving weather information from a server of a meteorological administration through web crawling or deep-learning weather information using the database, in response to determining that weather information is not input.

In another general aspect, there is provided an urban air mobility (UAM) noise reduction system including offset wave outputters provided at a mobility transit stop and being configured to output offset waves to offset noise generated by a UAM, a microphone configured to receive noise generated in response to the UAM taking off or landing, a noise canceling sound wave calculator configured to calculate the offset waves using the noise received through the microphone, and an output controller configured to control the offset waves to be output to the UAM through speakers.

Other features and aspects will be apparent from the following detailed description, the drawings, and the claims.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

Figure 1:
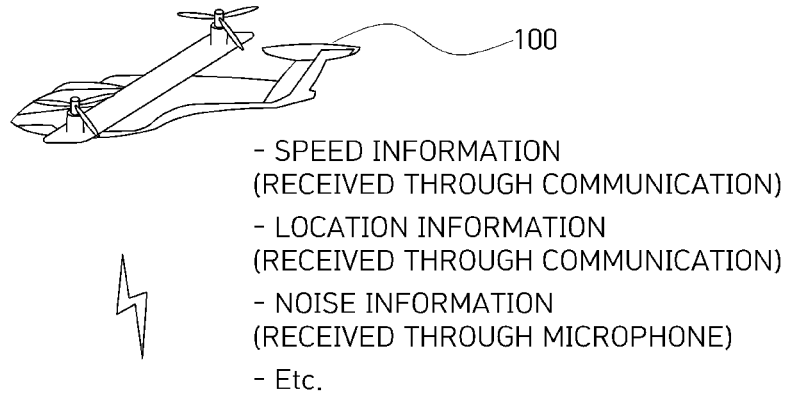
FIG. 1 is a configuration diagram for describing an urban air mobility (UAM) noise reduction system according to an embodiment of the present disclosure.
Figure 1:
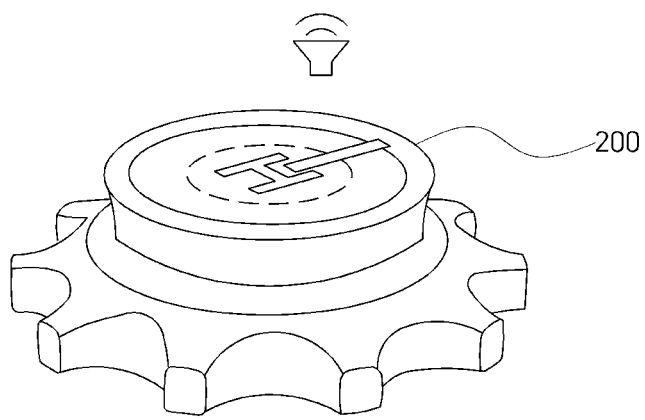

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Throughout the specification, when a component is described as being "connected to" or "coupled to" another component, it may be directly "connected to" or "coupled to" the other component, or there may be one or more other components intervening therebetween. In contrast, when an element is described as being "directly connected to" or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

FIG. 1 is a configuration diagram for describing an urban air mobility (UAM) noise reduction system according to an embodiment of the present disclosure.

The UAM noise reduction system according to the embodiment of the present disclosure includes a UAM 100 and a noise canceling device 200.

The UAM 100 is a transportation means capable of takeoff or landing vertically using a plurality of rotors and detects rotation per minute (RPM) information of a propeller and location coordinate information and provides the RPM information and the location coordinate information to the noise canceling device 200.

The noise canceling device 200 predicts a noise canceling sound wave amplitude on the basis of the RPM information of the propeller and the location coordinate information, which are received through the UAM 100, and outputs a noise canceling sound wave corresponding to the predicted noise canceling sound wave amplitude to the UAM 100.

Figure 2:
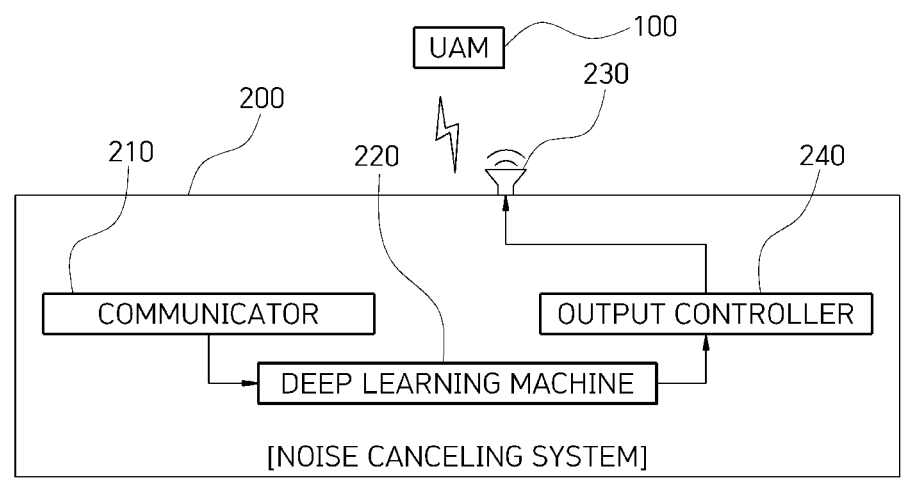
FIG. 2 is a block diagram for describing a detailed configuration of a noise canceling device of FIG. 1.

In an embodiment of the present disclosure, the noise canceling device 200 includes a communicator 210, a deep learning machine 220, a speaker 230, and an output controller 240 as shown in FIG. 2.

The communicator 210 receives PRM information of the propeller and location information through communication with the UAM 100. In the present embodiment, the communicator 210 is not limited and various types of communicator devices may be used as the communicator 210.

The deep learning machine 220 predicts a noise canceling sound wave amplitude from the RPM information of the propeller and location information of the UAM 100 which are received through the communicator 210.

The speaker 230 outputs a noise canceling sound wave, and a huge audio system may be formed by installing one or more speakers 230 at a mobility transit stop.

The output controller 240 controls at least one speaker 230 to output the noise canceling sound wave amplitude predicted by the deep learning machine 220.

According to an embodiment of the present disclosure, it is possible to reduce noise generated by a UAM that is taking off or landing at a mobility transit stop.

According to an embodiment of the present disclosure, it is possible to significantly reduce a certain level of noise including rotor noise, motor rotation noise, engine noise, etc. which are generated by a UAM.

In addition, according to an embodiment of the present disclosure, noise can be automatically controlled according to a place at which a user is located or surrounding conditions.

Figure 3:
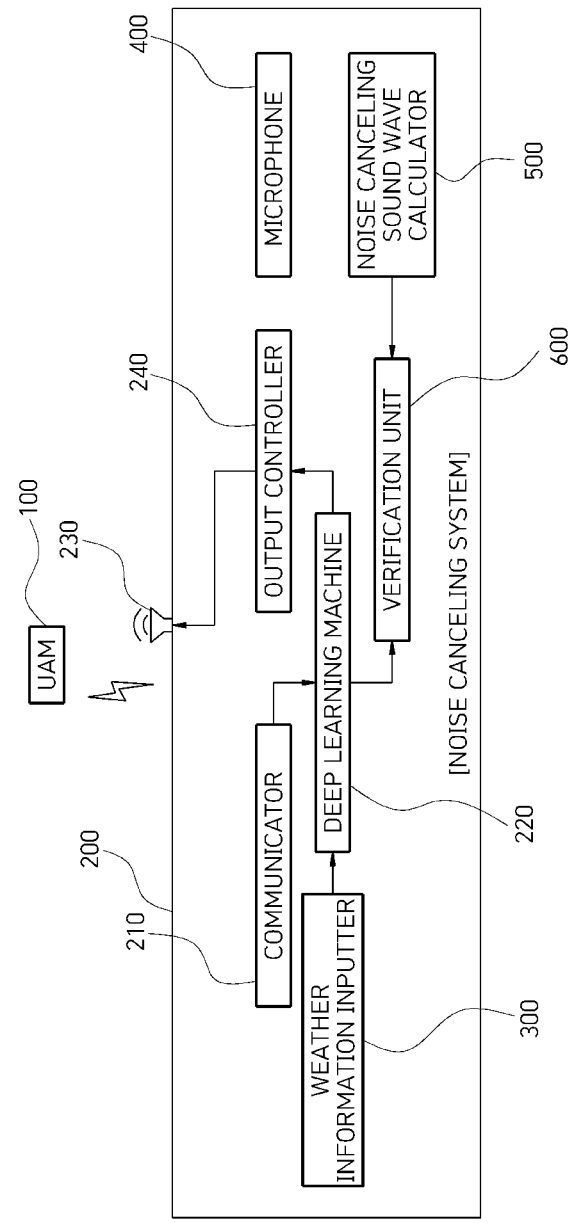
FIG. 3 is a block diagram for describing a UAM noise reduction system according to another embodiment of the present disclosure.

FIG. 3 is a block diagram for describing a UAM noise reduction system according to another embodiment of the present disclosure.

In another embodiment of the present disclosure, the UAM noise reduction system may further include a weather information inputter 300, and a deep learning machine 220 may predict a noise canceling sound wave amplitude by further taking into consideration weather information. In the present embodiment, the weather information inputter 300 may collect weather information directly from sensing devices, such as a thermometer, a hygrometer, an airflow meter, and a precipitation meter, or collect weather information through web crawling at a web site of the Korean Meteorological Administration (KMA).

As described above, when a noise canceling sound wave amplitude is predicted, weather information may be further taken into consideration to increase a noise reduction effect by accurately offsetting a change in the noise canceling sound wave amplitude according to a weather condition during takeoff or landing of the same UAM.

In another embodiment of the present disclosure, the UAM noise reduction system may further include a microphone 400 and a noise canceling sound wave calculator 500.

The microphone 400 receives actual noise generated when the UAM is taking off or landing.

The noise canceling sound wave calculator 500 may digitize the actual noise, which is generated by the UAM 100 and received through the microphone 400, and calculate an offset wave having an inverse phase wavelength.

Therefore, in an embodiment of the present disclosure, the UAM noise reduction system may further include a verification unit or verifier 600.

The verification unit or verifier 600 may verify the noise canceling sound wave amplitude predicted from the noise canceling sound wave amplitude calculated by the noise canceling sound wave calculator 500. In an example, the verification unit or verifier 600 may verify a noise canceling sound wave amplitude predicted from the offset wave calculate by the noise canceling sound wave calculator 500. The verification unit or verifier 600 may manage the verified noise canceling sound wave amplitude by storing the verified noise canceling sound wave amplitude in a database, thereby more accurately predicting the noise canceling sound wave amplitude.

Figure 4:
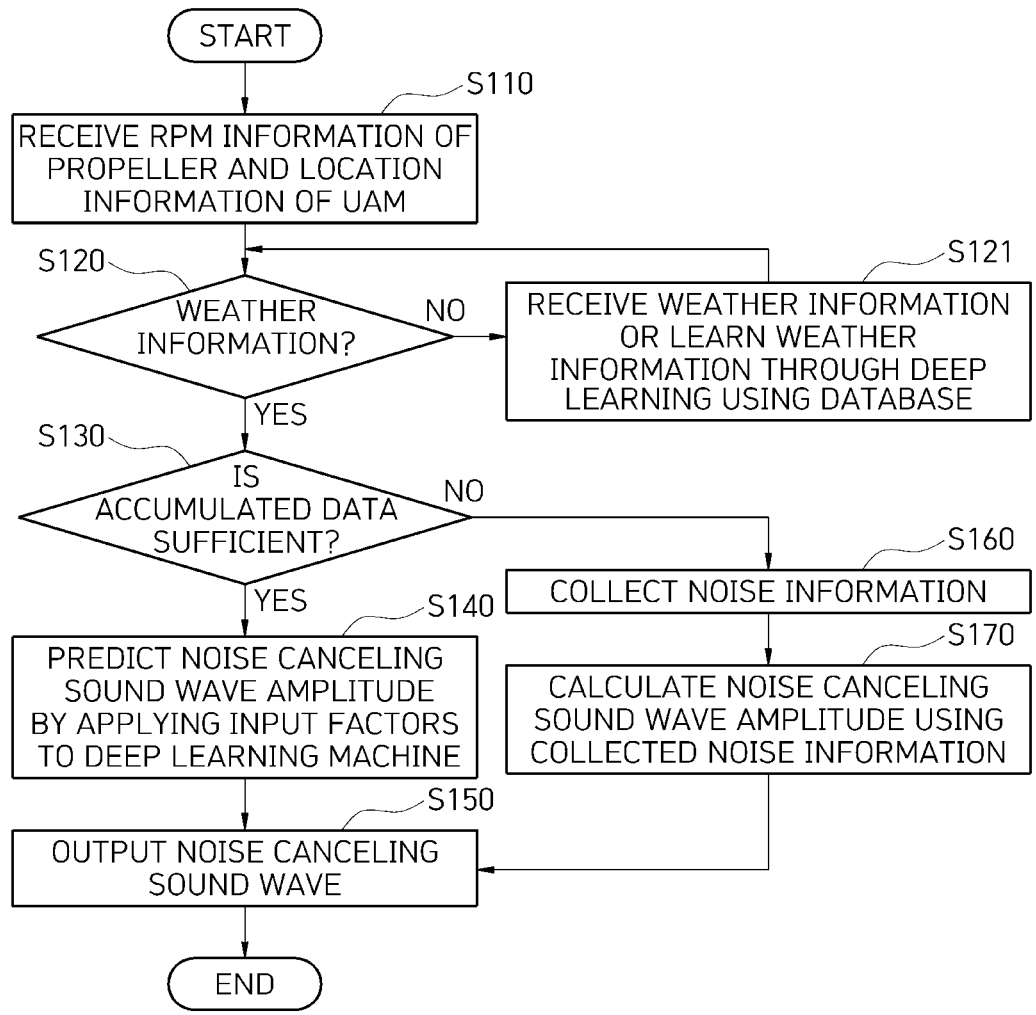
FIG. 4 is a flowchart of a UAM noise reduction method according to an embodiment of the present disclosure.

A UAM noise reduction method according to an embodiment of the present disclosure will be described with reference to FIG. 4 below.

First, RPM information of a propeller and location information are received from a UAM (S110).

Next, it is determined whether weather information is input (S120).

When it is determined in the determining of whether weather information is input (S120) that weather information is input (YES), an alternating effect between factors is analyzed to determine whether accumulated data is sufficient (S130). Factors analyzed in an embodiment of the present disclosure may include the RPM information of the propeller and the location information or may include the RPM information of the propeller, the location information, and the weather information.

When it is determined in the determining of whether the accumulated data is sufficient (S130) that the accumulated data is sufficient (YES), a noise canceling sound wave amplitude is predicted by applying input factors to a deep learning machine (S140).

Thereafter, the predicted noise canceling sound wave amplitude is output through a speaker (S150).

When it is determined in the determining of whether weather information is input (S120) that weather information is not input (NO), weather information is received from a server of a meteorological administration through web crawling or is learned through deep-learning using the database of the UAM noise reduction system (S121).

After the noise canceling sound wave amplitude is predicted (S140), the predicted noise canceling sound wave amplitude is managed by being stored in the database. To this end, it is determined whether accumulated data satisfies reference reliability.

When it is determined in the determining of whether the accumulated data satisfies the reference reliability that the accumulated data satisfies the reference reliability, information about factors used in predicting the noise canceling sound wave amplitude is stored in the database. The noise canceling sound wave amplitude stored in the database and learned may be verified by comparison with a noise canceling sound wave amplitude calculated from noise collected through the microphone 400.

When it is determined in the determining of whether the accumulated data is sufficient (S130) that the accumulated data is insufficient (NO), noise information is collected through the microphone 400 (S160), and a noise canceling sound wave amplitude is calculated using information about noise of the UAM 100 (S170) and thereafter is output through the speaker (S150).

Figure 5:
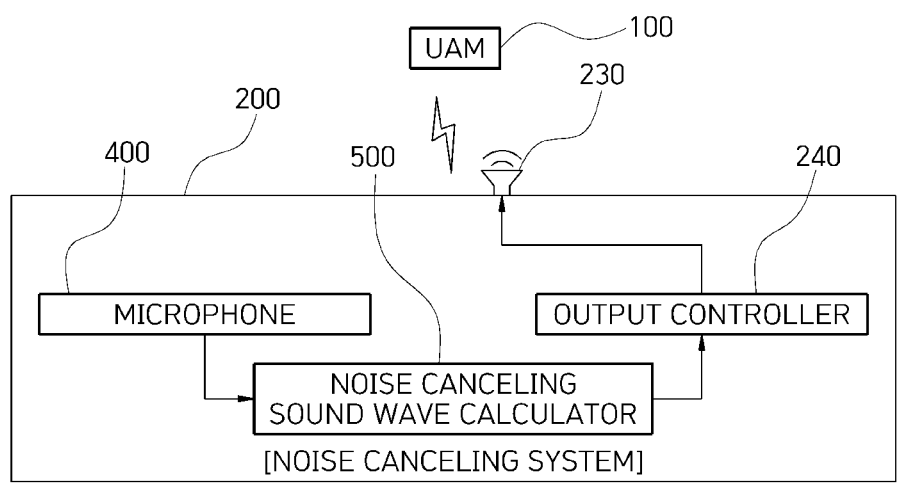
FIG. 5 is a block diagram for describing a UAM noise reduction system according to another embodiment of the present disclosure.

FIG. 5 is a block diagram for describing a UAM noise reduction system according to another embodiment of the present disclosure.

As shown in FIG. 5, the UAM noise reduction system according to the embodiment of the present disclosure includes a microphone 400, a noise canceling sound wave calculator 500, and a speaker 230.

The microphone 400 receives actual noise generated when the UAM is taking off or landing.

The noise canceling sound wave calculator 500 may calculate an offset wave using actual noise that is generated by the UAM 100 and received through the microphone 400.

A plurality of speakers 230 may be provided at a mobility transit stop to output an offset wave for offsetting noise generated by the UAM 100.

The output controller 240 controls the calculated offset wave to be output to the UAM 100 through the plurality of speakers 230.

As described above, according to another embodiment of the present disclosure, a UAM noise reduction system may be provided at a mobility transit stop to receive actual noise generated when a UAM is taking off or landing through a microphone, calculate an offset wave from the actual noise received through the microphone, and output the calculated offset wave to the UAM through a plurality of speakers, thereby reducing noise generated during the takeoff or landing of the UAM.

According to an embodiment of the present disclosure, a noise problem that is a biggest problem of an air mobility system when taking off or landing can be fixed using artificial intelligence and active noise control (ANC) of a HUB audio system.

As described above, an urban air mobility (UAM) noise reduction apparatus is provided in which a mobility transit stop (HUB) is configured as a single huge audio apparatus to reduce noise during takeoff or landing of a UAM using active noise control (ANC) and artificial intelligence.

While the configurations of the present disclosure have been described above in detail with reference to the accompanying drawings, the configurations are merely examples and various modifications and changes may be made therein within the scope of the present disclosure by those of ordinary skill in the technical field to which the present disclosure pertains. Therefore, the scope of the present disclosure is not limited to the aforementioned embodiments and should be defined by the following claims.

Each step included in the learning method described above may be implemented as a software module, a hardware module, or a combination thereof, which is executed by a computing device.

Also, an element for performing each step may be respectively implemented as first to two operational logics of a processor.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

The devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the urban air mobility (UAM) noise reduction method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An urban air mobility (UAM) noise reduction system comprising:
    a UAM configured to detect and to provide rotation per minute (RPM) information of a propeller and location coordinate information;
    a noise canceling device configured to predict a noise canceling sound wave amplitude on the basis of the RPM information of the propeller and the location coordinate information received through the UAM and to output a noise canceling sound wave corresponding to the predicted noise canceling sound wave amplitude to the UAM; and
    a verifier configured to verify the noise cancelling sound wave amplitude and to manage the verified noise canceling sound wave amplitude by storing the verified noise canceling sound wave amplitude in a database.

2. The UAM noise reduction system of claim 1, wherein the noise canceling device comprises:
    a communicator configured to receive the RPM information of the propeller and the location coordinate information through communication with the UAM;
    a deep learning machine configured to predict the noise canceling sound wave amplitude on the basis of the RPM information of the propeller and the location coordinate information of the UAM that are received through the communicator;
    one or more speakers configured to output the noise canceling sound wave; and
    an output controller configured to control the one or more speakers to output the noise canceling sound wave amplitude predicted by the deep learning machine.

3. The UAM noise reduction system of claim 2, further comprising a weather information inputter configured to receive weather information,
    wherein the deep learning machine predicts the noise canceling sound wave amplitude based on the RPM information of the propeller, the location coordinate information of the UAM, and the weather information.

4. The UAM noise reduction system of claim 1, further comprising:
    a microphone configured to receive noise generated, in response to the UAM taking off or landing; and
    a noise canceling sound wave calculator configured to calculate an offset wave using the noise received through the microphone.

5. The UAM noise reduction system of claim 4, wherein the noise canceling sound wave amplitude is predicted from the offset wave.

6. A processor-implemented urban air mobility (UAM) noise reduction method comprising:
    receiving rotation per minute (RPM) information of a propeller and location information from a UAM;
    determining whether accumulated data is sufficient by analyzing the RPM information and the location information received from the UAM;
    predicting a noise canceling sound wave amplitude by applying the received RPM information and the received location information to a deep learning machine, in response to determining that the accumulated data is sufficient;

storing information about the RPM information and the location information used in predicting the noise canceling sound wave amplitude in a database, in response to determining that the accumulated data satisfies a reference reliability; and outputting the predicted noise canceling sound wave amplitude through a speaker.

7. The UAM noise reduction method of claim 6, further comprising calculating a noise canceling sound wave amplitude using noise information collected through a microphone, in response to determining that the accumulated data is insufficient.

8. The UAM noise reduction method of claim 6, further comprising:

determining whether weather information is input; and analyzing the RPM information of the propeller, the location information and the weather information based on an alternating effect between the propeller, the location information and the weather information, in response to determining that the weather information is input.

9. The UAM noise reduction method of claim 6, further comprising receiving weather information from a server of a meteorological administration through web crawling or deep-learning weather information using the database, in response to determining that weather information is not input.

10. An urban air mobility (UAM) noise reduction system comprising:

offset wave outputters provided at a mobility transit stop and being configured to output offset waves to offset noise generated by a UAM;

a microphone configured to receive noise generated in response to the UAM taking off or landing;

a noise canceling sound wave calculator configured to calculate the offset waves using the noise received through the microphone;

a verifier configured to verify noise canceling sound wave amplitude of the offset waves and to manage the verified noise canceling sound wave amplitude by storing the verified noise canceling sound wave amplitude in a database; and an output controller configured to control the offset waves to be output to the UAM through speakers.

\* \* \* \* \*